United States Patent
Jaunky et al.

(10) Patent No.: US 8,486,188 B2
(45) Date of Patent: Jul. 16, 2013

(54) POLYHYDROXYFUNCTIONAL POLYSILOXANE AS ANTI-ADHESIVE AND DIRT-REPELLANT ADDITIVES

(75) Inventors: Wojciech Jaunky, Wesel (DE); Albert Frank, Xanten (DE); Hans-Willi Bogershausen, Tonisvorst (DE); Wolfgang Griesel, Hamminkeln (DE); Petra Della Valentina, Dinslaken (DE); Jurgen Omeis, Dorsten-Lembeck (DE)

(73) Assignee: BYK-Chemie GmbH (DE)

(*) Notice: Subject to any disclaimer, the term of this patent is extended or adjusted under 35 U.S.C. 154(b) by 0 days.

(21) Appl. No.: 13/002,739

(22) PCT Filed: Jul. 6, 2009

(86) PCT No.: PCT/EP2009/004866
§ 371 (c)(1),
(2), (4) Date: Apr. 25, 2011

(87) PCT Pub. No.: WO2010/003610
PCT Pub. Date: Jan. 14, 2010

(65) Prior Publication Data
US 2011/0185947 A1    Aug. 4, 2011

(30) Foreign Application Priority Data
Jul. 8, 2008 (DE) .......................... 10 2008 032 066

(51) Int. Cl.
- C09D 7/00 (2006.01)
- C07F 7/08 (2006.01)
- C08G 77/04 (2006.01)
- C08G 77/38 (2006.01)
- C08K 5/05 (2006.01)
- C08L 83/04 (2006.01)

(52) U.S. Cl.
USPC ........ 106/287.14; 528/29; 524/474; 524/588; 524/765; 556/453

(58) Field of Classification Search
None
See application file for complete search history.

(56) References Cited

U.S. PATENT DOCUMENTS

| | | | |
|---|---|---|---|
| 3,381,019 A | | 4/1968 | Morehouse |
| 4,431,789 A | | 2/1984 | Okazaki et al. |
| 4,640,940 A | | 2/1987 | Jacobine et al. |
| 5,306,838 A | * | 4/1994 | Shioya et al. ................ 556/445 |
| 5,916,992 A | | 6/1999 | Wilt et al. |
| 5,939,491 A | | 8/1999 | Wilt et al. |
| 6,072,011 A | | 6/2000 | Hoover |
| 6,150,311 A | * | 11/2000 | Decoster et al. .............. 510/122 |
| 6,365,670 B1 | | 4/2002 | Fry |
| 7,001,971 B2 | * | 2/2006 | Nakanishi ........................ 528/29 |
| 7,074,950 B2 | * | 7/2006 | Ochs et al. .................... 556/445 |
| 2003/0120022 A1 | | 6/2003 | Sunder et al. |
| 2005/0008600 A1 | | 1/2005 | Nakanishi et al. |
| 2005/0084467 A1 | * | 4/2005 | Miyanaga .................. 424/70.12 |
| 2005/0261133 A1 | | 11/2005 | Nakanishi et al. |
| 2006/0034875 A1 | | 2/2006 | Nakanishi et al. |
| 2012/0172478 A1 | * | 7/2012 | Chang et al. .................... 522/64 |

FOREIGN PATENT DOCUMENTS

| | | |
|---|---|---|
| DE | 10 2006 031152 A1 | 1/2008 |
| EP | 1 489 128 A | 12/2004 |
| EP | 1 785 410 | 5/2007 |
| JP | 10316526 A * | 12/1998 |
| JP | 10316540 | 12/1998 |
| WO | WO-02/40572 | 5/2002 |

OTHER PUBLICATIONS

Machine-generated English-language translation of JP-10316526, 6 pages, translation generated Jul. 2012.*
"International Application No. PCT/EP2009/004866, International Preliminary Examination Report (German) issued Aug. 30, 2010", 10 pgs.
"International Application No. PCT/EP2009/004866, International Search Report and Written Opinion mailed Oct. 22, 2009", 11 pgs.
Rokicki, G., et al., "Hyperbranched aliphatic polyethers obtained from environmentally benign monomer: glycerol carbonate", Green Chemistry, 7, (2005), 529-539.
Sunder, A., et al., "Controlled Synthesis of Hyperbranched Polyglycerols by Ring-Opening Multibranching Polymerization", Macromolecules, 32(13), (1999), 4240-4246.
Suzuki, T., "Preparation of poly(dimethylsiloxane) macromonomers by the 'initiator method': 2. Polymerization mechanism", Polymer, 30(2), (Feb. 1989), 333-337.
"International Application No. PCT/EP2009/004886, Translation of International Preliminary Report on Patentability mailed May 18, 2011", 6 pgs.

* cited by examiner

Primary Examiner — Robert S Loewe
(74) Attorney, Agent, or Firm — Schwegman Lundberg & Woessner, P.A.

(57) ABSTRACT

The invention relates to a method for production of polyhydroxyfunctional polysiloxanes with branched polyglycidol polyether groups, in which firstly at least one allylic or methallylic starting material is reacted with at least one glycidol, such that an allyl polyether or methallyl polyether is formed, and then the allyl polyether or methallyl polyether thus produced is added to a Si—H functional alkyl polysiloxane in the presence of an acid buffering agent. The invention further relates to polysiloxanes, which may be obtained by said method and the use of the polysiloxanes in coating agents, polymeric coating masses and thermoplastics.

17 Claims, No Drawings

US 8,486,188 B2

POLYHYDROXYFUNCTIONAL POLYSILOXANE AS ANTI-ADHESIVE AND DIRT-REPELLANT ADDITIVES

PRIORITY CLAIM TO RELATED APPLICATIONS

This application is a national stage application under 35 U.S.C. §371 of PCT/EP2009/004866, filed Jul. 6, 2009, and published as WO 2010/003610 A1 on Jan. 14, 2010, which claims priority to German Application No. 10 2008 032 066.8, filed Jul. 8, 2008, which applications and publication are incorporated herein by reference and made a part hereof in their entirety, and the benefit of priority of each of which is claimed herein.

The present invention relates to polyhydroxy-functional polysiloxanes which can be prepared by the addition reaction of polyhydroxy-functional allyl polyethers with alkylhydrosiloxanes.

It is known to add polysiloxanes to coatings and polymeric moulding compounds in order to achieve certain qualities, for example improved scratch resistance or improved levelling in the case of furniture varnishes and vehicle finishes. Use of the polysiloxanes is widespread and very diverse.

Polyhydroxy-functional polysiloxanes are known in principle from numerous patent specifications.

U.S. Pat. No. 3,381,019 describes the preparation of siloxane-alcohol ethers by the reaction of polyhydroxy-functional allyl compounds with Si—H-functional polysiloxanes. The resulting compounds are described as foam stabilizers and as defoamers for aqueous systems.

U.S. Pat. No. 4,640,940 describes the preparation of polyol-terminated silicones and the use of these compounds with free OH groups, or their derivatives, in curable compositions, including radiation-curable compositions.

U.S. Pat. No. 5,916,992 and U.S. Pat. No. 5,939,491 describe polysiloxane polyols having primary OH groups and also curable coatings which comprise these polysiloxane polyols. These coatings are said to feature improved adhesion, scratch resistance and high gloss.

U.S. Pat. No. 4,431,789 describes the preparation of organosiloxanes with alcoholic hydroxyl groups. The compounds are prepared by the hydrosilylation of methylhydrosiloxanes and polyglycerols which have a terminal allyl group. The compounds obtained in this way can be used as nonionic surface-active polysiloxanes.

JP 10316540 describes reaction products of methylhydrosiloxanes and allyl polyglycerols, very similar to those in U.S. Pat. No. 4,431,789, as hair-conditioning agents.

US 2006/0034875 describes the synthesis of polyglycerol-modified polysiloxanes for use as emulsifiers. These emulsifiers are suitable for storing oils by incorporation with swelling in cosmetic preparations.

US 2005/0008600 (EP 1 496 080) describes the synthesis of alternating $(AB)_n$ copolymers of polysiloxanes and polyglycerol and the use thereof in cosmetics. Described advantageously is the imparting of a soft-feel effect, the moisturizing and the imparting of shine.

U.S. Pat. No. 6,365,670 discloses the preparation of organopolysiloxane gels for cosmetic applications, through the reaction of an unsaturated organopolysiloxane resin, an Si—H-functional crosslinker and an unsaturated polyglycerol.

US 2005/0261133 discloses the preparation and use of polyglycerol-modified polysiloxanes as spreading agents for chemical crop protection formulations. The products disclosed reduce the surface tension of crop protection products, in order to improve the spreading of pesticides and insecticides on leaf surfaces.

EP 1 489 128 A1 describes the synthesis of polysiloxanes which are modified with branched polyglycerols. The hydroxy-functional polysiloxane is modified by employing a process in which elemental potassium or basic compounds of potassium are employed in order to start the polymerization from the activated hydroxyl groups. The products produced with a reaction regime of this kind, however, include equilibration products and elimination products, which restrict the use of the target compounds in applications where a high level of product homogeneity is important, such as in automobile finishing, for example. Evidently, therefore, EP 1 489 128 A1 relates more particularly to applications of the modified silicones in fabrics/textiles and in cosmetic formulations. Advantages identified are improved wetting and adsorption on various substrates, a lower level of yellowing and skin irritation. In relation to the prior art, EP 1 489 128 A1 observes that, in the reaction of linear polyglycerols modified by allyl groups with silicone hydrides, the products obtained are gel-like and do not exhibit a reproducible viscosity.

The aforementioned polyglycerol-modified polysiloxanes find use primarily in cosmetic formulations where they are advantageous in respect of the emulsifying and moisturizing properties, and also for the imparting of soft-feel properties.

DE 10 2006 031 152 A1 discloses branched, polyhydroxy-functional polysiloxanes which can be prepared by addition reaction of hydroxyoxetane-based polyhydroxy-functional allyl polyethers with alkyl-hydrogen-siloxanes. The use of branched poly(hydroxyoxetane)-based polysiloxanes in very polar coating systems, more particularly aqueous coating systems, however, is subject to certain restrictions, some of which may be attributed to the solubility of the polysiloxanes. Consequently there was a demand for additives which are particularly suitable for polar systems as well.

The object of the present invention was to improve the properties of coating compositions, polymeric moulding compounds and thermoplastics. More particularly the object was to provide coating compositions, polymeric moulding compounds and thermoplastics which display an improved anti-adhesive and/or dirt-repellent action. Furthermore, the additives added in order to impart these improved properties ought as far as possible not to detract from the other properties of the coating compositions, polymeric moulding compounds or thermoplastics. The additives added ought also to be able to develop their activity in relatively low amounts. The coating compositions, polymeric moulding compounds and thermoplastics ought, furthermore, to virtually retain their anti-adhesive and/or dirt-repellent action over a long time period, of several years, even under outdoor weathering conditions. This retention of properties ought also to include the permanence of the anti-adhesive and/or dirt-repellent effect over a plurality of cleaning cycles.

Totally surprisingly it has been found that the objects described above are achieved by means of polyhydroxy-functional polysiloxanes which can be prepared by the addition reaction of at least one branched glycidol-based polyhydroxy-functional allyl polyether in the presence of an acid-buffering agent with an Si—H-functional alkylpolysiloxane. In this context it was especially surprising that the disadvantages reported in EP 1 489 128 A1 in the reaction of linear polyglycerols with silicone hydrides do not occur when the branched, glycidol-based polyhydroxy-functional allyl polyethers are employed, and it is therefore possible to obtain products which not only do not differ structurally from silicones modified with linear polyglycerols, but also exhibit a high level of product homogeneity.

It is found to be advantageous, furthermore, that the OH groups of the polyglycidol block are able to crosslink with reactive groups of the binder, and thus ensure a lasting effect.

Coating compositions, polymeric moulding compounds or thermoplastics to which these addition products are added exhibit excellent anti-adhesive and dirt-repellent properties. The addition products of the invention also do not substantially detract from the other properties of the coating compositions, polymeric moulding compounds or thermoplastics. These polyhydroxy-functional polysiloxanes can be added in relatively low amounts (additive amounts) to the coating compositions or polymeric moulding compounds. The physical properties of the original coating compositions, polymeric moulding compounds and thermoplastics, in respect, for example, of corrosion control, gloss retention and weathering stability, are unaffected by the low concentrations of the additive. Coating compositions, polymeric moulding compounds and thermoplastics which comprise the addition products of the invention generally also display the desired properties over a time period of several years, and also retain these properties over a plurality of cleaning cycles.

The polyhydroxy-functional polysiloxane of the invention that can be added to coating compositions, polymeric moulding compounds and thermoplastics is preparable via the addition reaction of at least one branched polyhydroxy-functional allyl polyether with an Si—H-functional polysiloxane. The expression "branched polyether" in this context stands for a polyether in which the main chain and at least one side chain contain polyether bridges. Preferably the at least one branched polyether has a hyperbranched structure. The branching can be detected by NMR analysis, for example.

The Si—H-functional polysiloxane can be a chain polymer, a cyclic polymer, a branched polymer or a crosslinked polymer. Preferably it is a chain polymer or a branched polymer. With particular preference it is a chain polymer. The Si—H-functional alkylpolysiloxane is preferably an alkylhydropolysiloxane substituted by corresponding $C_1$-$C_{14}$ alkylene, arylene or aralkylenes. Preferably the alkylhydropolysiloxane is a methylhydropolysiloxane.

Preferred subject matter of the invention are polyhydroxy-functional chain-like polysiloxanes which can be represented by the following general formula (I):

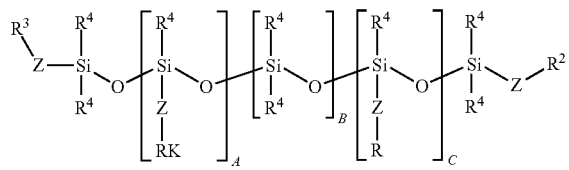

where
Z=$C_1$-$C_{14}$ alkylene,
RK=unbranched polyether radical composed of alkylene oxide units having 1-6 carbon atoms, and/or aliphatic and/or cycloaliphatic and/or aromatic polyester radical having a weight-average molecular weight of between 200 and 4000 g/mol,
R=polyhydroxy-functional branched polyglycidol polyether radical, which consists of a branched polyglycidol group or contains the latter,
$R^2$ and $R^3$ independently of one another are $C_1$-$C_{14}$ alkyl aryl or aralkyl, —O($C_1$-$C_{14}$ alkyl, aryl or aralkyl), —OCO($C_1$-$C_{14}$ alkyl, aryl or aralkyl), —O—CO—O($C_1$-$C_{14}$ alkyl, aryl or aralkyl), —OSO$_2$($C_1$-$C_{14}$ alkyl, aryl or aralkyl), —H, —Cl, —F, —OH, —R, —RK,
$R^4$=$C_1$-$C_{14}$ alkyl, aryl or aralkyl,
A=0-20, preferably 1-15, more preferably 1-8,
B=2-300, preferably 10-200, more preferably 15-100 and
C=0-20, preferably 1-15, more preferably 1-8;
and if C=0 then $R^3$=R and/or $R^2$=R.

If the unit —[SiR$^4$(Z—R)]—O— is present, i.e. C is at least 1, then it is possible for $R^2$ and $R^3$ to be different from R.

Weight-average and number-average molecular weights are determined in the context of this invention for the starting compounds used and the end products by gel permeation chromatography against a polystyrene standard.

Compounds of the general formula (I) in which A is at least 1 are advantageously used in those systems which require a compatibility adaptation.

The copolymers corresponding to the structural formula indicated above may be random copolymers, alternating copolymers or block copolymers. In addition, a gradient may be formed by the sequence of the side chains along the silicone backbone. The A units of the formula —[SiR$^4$(Z—RK)]—O—, the B units —Si(R$^4$)$_2$—O— and the C units —[SiR$^4$(Z—R)]—O— may be arranged in any order in the polysiloxane chain.

As may be concluded from the structure of the formula (I) and from the corresponding definitions for A, B and C, the chain-like polyhydroxy-functional polysiloxanes of the invention are composed of 4 to 342 siloxane units. Preferably the chain-like polyhydroxy-functional polysiloxanes of the invention are composed of 10 to 100 siloxane units, more preferably of 20 to 80 siloxane units, with particular preference of 30 to 70 siloxane units.

In order to incorporate the polyhydroxy-functional branched polyether alkyl radical —Z—R into the Si—H-functional polysiloxane, it is preferred to use one or more branched polyhydroxy-functional allyl polyethers which can be prepared by ring-opening polymerization of glycidol or glycerol carbonate with one or more hydroxy-bearing allylic starter compounds. These branched polyhydroxy-functional allyl polyethers can be introduced into the polysiloxane by addition reaction. They generally have exactly one allyl group, i.e. they are monoallylic and thus do not act as crosslinker or linker between two or more Si—H-functional polysiloxanes.

These allylic starter compounds may be monofunctional with respect to the hydroxyl groups.

Preference is given to using mono-hydroxy-functional allylic starter compounds from the group consisting of allyl alcohol, ethylene glycol monoallyl ether, allylpolyethylene glycol, allylpolypropylene glycol, allylpolyethylene/polypropylene glycol copolymers, where ethylene oxide and propylene oxide may be arranged in random structure or blockwise.

Particular preference is given to using allyl alcohol, ethylene glycol monoallyl ether and allylpolyethylene glycol as mono-hydroxy-functional allylic starter compounds. Allyl alcohol is especially preferred.

Use may also be made of the corresponding methallyl compounds, such as, for example, methallyl alcohol, methallyl polyethylene glycol, etc. Reference in the context of this invention to allylic starter compounds also embraces the methallylic analogues, without any necessity for this to be stated separately. Where the term "(meth)allylic" is used, this term likewise encompasses both "allylic" and "methallylic".

Other mono-hydroxy-functional allylic and methallylic starter compounds as well may be used, such as allylphenol, for example. Further possibilities are the use of (meth)allylic starter compounds with other hydrogen-active groups than the hydroxyl group, such as amino groups (—$NH_2$, —NH (alkyl)) or thiol groups (—SH), for example.

It is also possible to use di-, tri- or polyfunctional starter compounds, which exhibit advantages in respect of the polydispersity and certain physical properties. The hydroxyl groups of the difunctional or polyfunctional monoallylic starter compound are preferably etherified with a diol, triol or polyol, for example a dihydroxy-, trihydroxy- or polyhydroxy-ester or -polyester or a dihydroxy-, trihydroxy- or polyhydroxy-ether or polyether, such as, for example, with a 5,5-dihydroxyalkyl-1,3-dioxane, a 5,5-di(hydroxyalkoxy)-1,3-dioxane, a 5,5-di(hydroxyalkoxyalkyl)-1,3-dioxane, a 2-alkyl-1,3-propanediol, a 2,2-dialkyl-1,3-propanediol, a 2-hydroxy-1,3-propanediol, a 2,2-dihydroxy-1,3-propanediol, a 2-hydroxy-2-alkyl-1,3-propanediol, a 2-hydroxyalkyl-2-alkyl-1,3-propane-diol, a 2,2-di(hydroxyalkoxy)-1,3-propanediol, a 2-hydroxyalkoxy-2-alkyl-1,3-propanediol, a 2,2-di(hydroxyalkoxy)-1,3-propanediol, a 2-(hydroxyalkoxyalkyl-2-alkyl-1,3-propanediol or a 2,2-di(hydroxyalkoxyalkyl)-1,3-propanediol.

Preferred embodiments of the stated difunctional or polyfunctional monoallylic starter compound are etherified with dimers, trimers or polymers of 5,5-dihydroxyalkyl-1,3-dioxanes, 5,5-di(hydroxyalkoxy)-1,3-dioxanes, 5,5-di(hydroxyalkoxyalkyl)-1,3-dioxanes, 2-alkyl-1,3-propanediols, 2,2-dialkyl-1,3-propanediols, 2-hydroxy-1,3-propanediols, 2,2-dihydroxy-1,3-propanediols, 2-hydroxy-2-alkyl-1,3-propanediols, 2-hydroxyalkyl-2-alkyl-1,3-propanediols, 2,2-di(hydroxyalkyl-1,3-propanediols, 2-hydroxyalkoxy-2-alkyl-1,3-propanediols, 2,2-di(hydroxyalkoxy)-1,3-propanediols, 2-hydroxyalkoxyalkyl-2-alkyl-1,3-propanediols and 2,2-di(hydroxyalkoxyalkyl)-1,3-propanediols.

The stated alkyl radicals are preferably linear or branched $C_1$-$C_{24}$, such as $C_1$-$C_{12}$ or $C_1$-$C_8$, for example, alkyls or alkenyls. Particularly preferred alkyl radicals are methyl and ethyl radicals. The expression "alkoxy" stands preferably for methoxy, ethoxy, propoxy, butoxy, phenylethoxy and comprises up to 20 alkoxy units or a combination of two or more alkoxy units.

Further-preferred embodiments of the allylic starter compound having at least two hydroxyl groups encompass monoallyl ethers or monomethallyl ethers of glycerol, of trimethylolethane and trimethylolpropane, monoallyl or mono(methallyl)ethers of di(trimethylol)ethane, of di(trimethylol)propane and of pentaerythritol, and also of 1,Ω-diols, such as, for example, mono-, di-, tri- and polyethylene glycols, mono-, di-, tri- and polypropylene glycols, 1,4-butanediol, 1,5-pentanediol, 1,6-hexanediol, 1,6-cyclohexanedimethanol and their correspondingly alkyl-, alkylalkoxy- and alkoxyalkyl-substituted analogues and also their derivatives. The designations "alkyl" and "alkoxy" correspond here to the definitions stated above.

With particular preference the allylic starter compound having at least two hydroxyl groups is derived from a compound from the group consisting of 5,5-dihydroxymethyl-1,3-dioxane, 2-methyl-1,3-propanediol, 2-methyl-2-ethyl-1,3-propanediol, 2-ethyl-2-butyl-1,3-propanediol, neopentyl glycol, dimethylolpropane, glycerol, trimethylolethane, trimethylolpropane, diglycerol, di(trimethylolethane), di(trimethylolpropane), pentaerythritol, di(pentaerythritol), anhydroenneaheptitol, sorbitol and mannitol.

It is particularly preferred for the di- or polyhydroxy-functional allylic starter compounds used to be trimethylolpropane monoallyl ether or glycerol monoallyl ether.

On allylic starter compounds of this kind the ring-opening polymerization with glycidol or with mixtures of glycidol with glycidyl ethers and/or with alkylene oxides takes place. In this case, the polymerization of the mixtures of glycidol with glycidyl ethers and/or with alkylene oxides can be performed in random structure or blockwise. The glycidyl ethers can be alkyl- or alkoxy-substituted.

The expression "alkyl" here stands preferably for linear or branched $C_1$-$C_{24}$, such as $C_1$-$C_{12}$ or $C_1$-$C_8$, for example, alkyls or alkenyls. With particular preference the expression "alkyl" stands for methyl, ethyl, propyl and butyl. The expression "polyalkoxy" stands preferably for methoxy, ethoxy, propoxy, butoxy, phenylethoxy and comprises up to 20 alkoxy units or a combination of two or more alkoxy units.

It is preferred to use glycidol or glycerol carbonate as principal monomer. This means that preferably at least 50 mol %, more preferably at least 70 mol % and very preferably at least 80 mol % of the radical R are synthesized from ring-opened glycidol or glycerol carbonate.

The allyl-functional hyperbranched polyglycidol can be prepared via a ring-opening polymerization procedure. In order to obtain well-defined structures, an anionic ring-opening polymerization with slow addition of monomer is particularly preferred.

Preference is given to employing the following method: the hydroxyl groups of the allyl-functional starter compound are deprotonated in part by alkali metal hydroxides or alkoxides, and, following removal of the water or alcohol by distillation, a mixture of initiator and initiator alcoholate is obtained. The glycidol is then added dropwise at a temperature between 80° C. and 100° C. to the initiator/initiator alcoholate mixture. The living anionic ring-opening polymerization is controlled through the rapid exchange of protons between the alcohol groups and alcoholate groups of the growing chains. The alkali is removed after the reaction, by treatment with an acidic ion exchanger, for example. Further details on reactions, reactants and procedures can be found in the following publications: Sunder A, Hanselmann R, Frey H, Müllhaupt R.: Macromolecules 1999; 32:4240-6, EP 1785410 or US2003/0120022.

The glycidol may be replaced by glycerol carbonate. The synthesis of glycerol carbonate and the reaction conditions under which these are reacted to hyperbranched polyglycidols are known to the skilled person from, for example, Rokicki et al. in: Green Chemistry, 2005, 7, 529-539.

When reference is made herein to hyperbranched polyglycidols, these can generally be obtained by ring-opening polymerization either of glycidol or of glycerol carbonate. Where reference is made herein to a ring-opening polymerization of glycidol, this generally also encompasses the variant in which glycerol carbonate is subjected to ring-opening reaction, with the skilled person adjusting where appropriate the reaction conditions to those described in Rockicki et al. (supra).

In one, more environmentally benign embodiment of the present invention, glycerol carbonate is used for preparing the hyperbranched polyglycidol structures. Glycerol carbonate can be prepared in a more environment-friendly way than glycidol, and, according to the present state of knowledge, does not possess the carcinogenicity of glycidol.

The hydroxyl groups may remain free or may be wholly or partly modified, in order to allow the optimum compatibility to be set in the application formulation.

The polyhydroxy-functional allyl compounds have at least one branching generation, preferably at least two branching generations. The expression "generation", as in WO 02/40572, is also used in the present case to designate pseudo-generations. The branching can, for example, be detected by NMR analysis. The polydispersity ($M_w/M_n$) of the branched allyl compounds is preferably <3, more preferably <2 and most preferably <1.5.

The formula (II) below shows a dendrimer reaction product, obtained preferably, which is obtainable from ethylene glycol monoallyl ether and glycidol in three generations. However, the products obtained are in reality at best described as pseudo-dendrimers or hyperbranched allyl-functional polyglycidols.

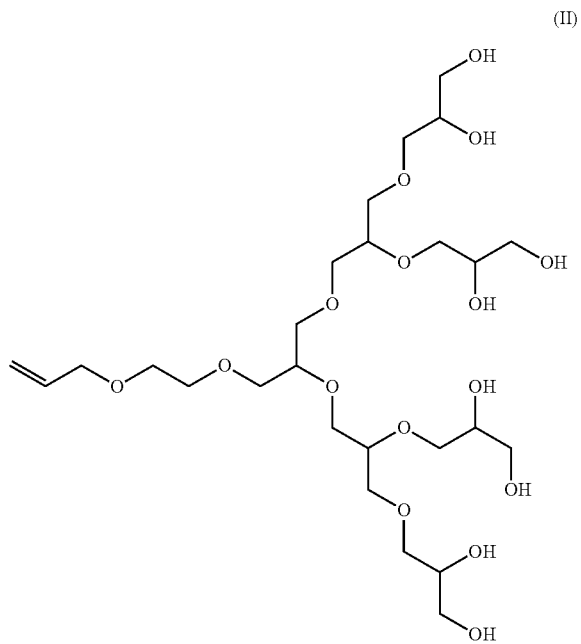 [SMILES: C=CCOCCOCC(COCC(COCC(O)CO)OCC(O)CO)OCC(COCC(O)CO)OCC(O)CO]

(II)

The polyhydroxy-functional polysiloxanes can be prepared by reaction of at least one allylic starter compound with at least one glycidol or glycerol carbonate and subsequent addition reaction in the presence of an acid-buffering agent with the Si—H-functional alkylpolysiloxane. Preference is given to reaction of the at least one allylic starter compound with a glycidol or glycerol carbonate and subsequent addition reaction with the Si—H-functional alkylpolysiloxane.

The synthesis of the polyhydroxy-functional polysiloxanes is accomplished preferably via addition reaction of the allyl polyethers, obtained by reaction of the allylic starter compound with at least one glycidol, with the Si—H-functional alkylpolysiloxane.

In order to improve the compatibility of the polyhydroxy-functional polysiloxanes prepared from these polyhydroxy-functional allyl polyethers, it is also possible to alkoxylate the free hydroxyl groups of the allyl polyethers, before or after the hydrosilylation reaction with the Si—H-functional polysiloxane. Preferably the groups are ethoxylated and/or propoxylated and/or butoxylated and/or alkoxylated with styrene oxide. It is possible here to prepare pure alkoxylates or mixed alkoxylates. With particular preference the free hydroxyl groups of the allyl polyethers are ethoxylated before the hydrosilylation reaction.

Additionally, apart from an alkoxylation, the free hydroxyl groups may also be modified chemically in other ways. Examples include methylation, acrylization, acetylation, esterification, and conversion to the urethane by reaction with isocyanates. An example of the latter reaction is the reaction of the hydroxyl groups with, for example, TDI monoadducts, which can be prepared by the reaction of polyether monools with TDI (toluene diisocyanate).

All other known modification possibilities for hydroxyl groups may also be employed. The aforementioned chemical conversions need not be complete. For instance, it is also possible for only some of the free hydroxyl groups, i.e., in particular at least one hydroxyl group, to have been chemically modified.

The modification is preferably carried out before the hydrosilylation reaction. In this case the modification of the free hydroxyl groups may also have a beneficial effect on the subsequent hydrosilylation reaction.

By way of the fraction of the free hydroxyl groups in the polyhydroxy-functional allyl polyether it is also possible to control the incorporability and/or the crosslinking density of the polyhydroxy-functional polysiloxane in the binder. If many or all of the original hydroxyl functions are retained, a higher crosslinking density is obtained, which can lead to improved hardness on the part of the coating system. Contrastingly, if substantially all of the hydroxyl groups are blocked, the molecule retains a certain mobility and, in the case of a multi-coat coating system, is able to migrate through the coats, so that the intercoat adhesion is not adversely affected.

In order to be able to adapt compatibilities of the polyhydroxy-functional polysiloxanes with the coating compositions, the polymeric moulding compounds and the thermoplastics, it can be sensible to use, in combination with the polyhydroxy-functional allyl compounds that are used in accordance with the invention, allyl polyethers as well, which are prepared by the alkoxylation of allyl alcohol or monoallyl ethers having one or more hydroxyl groups with alkylene oxides, more particularly ethylene oxide and/or propylene oxide and/or butylene oxide and/or styrene oxide. These already very well-established allyl polyethers are referred to below, for improved clarity, as "unbranched allyl polyethers" and they lead to "unbranched polyether radicals" Z—RK in the polysiloxane. In this context it is possible to prepare not only pure alkoxylates but also mixed alkoxylates. In mixed alkoxylates the alkoxylation may be blockwise, alternating or random. The mixed alkoxylates may also contain a distribution gradient in respect of the alkoxylation.

The end groups or end group of the unbranched allyl polyether may be hydroxy-functional or else, as described above, may have been converted, by methylation or acetylation, for example.

The unbranched polyether radical RK is preferably an ethylene oxide, ([EO]), a propylene oxide ([PO]) or an ethylene oxide-propylene oxide copolymer of the following formula (III)

$$RK=\!-\!O\text{-}[EO]_v\!-\!\![PO]_w\!-\!R^6 \qquad (III)$$

with v=0-70; if v=0 then w=1;
with w=0-50; if w=0 then v=1;
$R^6$ being H or an aliphatic, aromatic or araliphatic group which may also contain heteroatoms or functional groups, such as ester, urethane, for example.

By means of different fractions of ([EO]) and ([PO]) it is possible to influence the properties of the polysiloxane of the invention. Thus it is possible especially on account of the greater hydrophobicity of the [PO] units as compared with the [EO] units to control the hydrophobicity of the polysiloxane of the invention through the choice of suitable [EO]:[PO] ratios.

The copolymers corresponding to the structural formula indicated above may be random copolymers, alternating copolymers or block copolymers. It is also possible for a gradient to be formed by the sequence of the alkylene oxide units.

It is possible to use not just one unbranched allyl polyether. For improved control of the compatibility it is also possible to use mixtures of different unbranched allyl polyethers.

The reaction can be carried out in such a way that the unbranched allyl polyethers and the branched allyl polyethers are subjected in succession to addition reaction with the Si—H-functional alkylpolysiloxane. Alternatively the allyl polyethers can be mixed prior to the addition reaction, so that then the allyl polyether mixture is subjected to addition reaction with the Si—H-functional alkylpolysiloxane.

In order to be able to adapt compatibilities of the polyhydroxy-functional polysiloxanes with the coating compositions, the polymeric moulding compounds and the thermoplastics, it may be sensible, in combination with the polyhydroxy-functional allyl compounds used in accordance with the invention, to use allyl polyesters as well that can be obtained by the esterification of alcohols having an allylic double bond (1-alkenols, such as 1-hexenol, or hydroxy-functional allyl polyethers, such as ethylene glycol monoallyl ether, diethyl glycol monoallyl ether or higher homologues) with hydroxycarboxylic acids, and/or cyclic esters. The esterification takes place preferably by way of a ring-opening polymerization with propiolactone, caprolactone, valerolactone or dodecalactone, and derivatives thereof. With particular preference the ring-opening polymerization takes place with caprolactone. In this context it is possible to prepare not only pure polyesters but also mixed polyesters. In the case of mixed polyesters the esterification may be blockwise, alternating or random. The mixed polyesters may also contain a distribution gradient in respect of the esterification.

The end groups of the allyl polyester may be hydroxy-functional or else may have been converted, by means of methylation or acetylation, for example.

The weight-average molecular weights of the allyl polyesters or methallyl polyesters are preferably between 300 and 2000 g/mol and with particular preference between 400 and 1000 g/mol.

The reaction can be carried out in such a way that the linear allyl polyesters, methallyl polyesters, allyl polyethers or methallyl polyethers and the branched allyl polyethers or methallyl polyethers are subjected in succession to addition reaction with the Si—H-functional alkylpolysiloxane. Alternatively the branched and the unbranched allyl and methallyl compounds can be mixed prior to the addition reaction, so that then this mixture is subjected to addition reaction with the Si—H-functional alkylpolysiloxane.

In order to be able to adapt compatibilities of the polyhydroxy-functional polysiloxanes with the coating compositions, the polymeric moulding compounds and the thermoplastics, it may be sensible, in combination with the polyhydroxy-functional allyl compounds used in accordance with the invention, to use mixtures as well of the aforementioned unbranched allyl polyethers and allyl polyesters.

Particularly preferred—especially in easy-to-clean applications—are those polysiloxanes in which at least one Si—H-functional group has been reacted with an unbranched monoallyl polyether, an unbranched monomethallyl polyether, an unbranched monoallyl polyester or an unbranched monomethallyl polyester, and at least one further Si—H-functional group has reacted with a monoallylic or monomethallylic polyhydroxy-functional branched polyglycidol polyether.

In a further, especially preferred embodiment for easy-to-clean applications, and where A=0 to 20, preferably 1 to 8, and B=10 to 200, at least one of the radicals R a branched polyglycidol group which is attached by a linear polyalkoxylene group to the radical Z, or a branched polyglycidol group which is extended by alkoxylation.

Also particularly preferred are polysiloxanes of the above general formula (I) in which A=1 to 8, B=10 to 200 and C=0 to 20. Of these, preference is given in turn to those in which at least one of the radicals R comprises or consists of a branched polyglycidol group, and where the branched polyglycidol group is attached directly to Z.

More particularly it has been found that RK structures and/or branched polyglycidol groups joined to the radical Z via a linear alkoxylene group in the polysiloxane of the invention result in particularly suitable additives for easy-to-clean applications.

In general, however, it is the case that all polysiloxanes of the invention are suitable as mould release additives and find use as such.

Generally speaking the compatibilities of the polyhydroxy-functional polysiloxanes can be adapted to any of a very wide variety of matrices. In order to use the polyhydroxy-functional polysiloxanes in polycarbonates, for example, corresponding polycarbonate modifications can be built into the polyhydroxy-functional polysiloxanes, in the way described, for example, in U.S. Pat. No. 6,072,011.

Particular preference for use in coating compositions, polymeric moulding compounds and thermoplastics without compatibility problems is given to polysiloxanes of the general formula (IV)

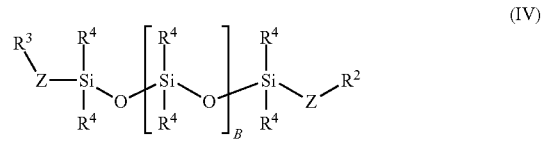

(IV)

where
$Z=C_1$-$C_{14}$ alkylene,
and where at least one substituent from the group consisting of $R^2$ and $R^3$ stands for R and the other stands for $C_1$-$C_{14}$ alkyl, aryl or aralkyl, —O($C_1$-$C_{14}$ alkyl, aryl or aralkyl), —OCO($C_1$-$C_{14}$ alkyl, aryl or aralkyl), —O—CO—O($C_1$-$C_{14}$ alkyl, aryl or aralkyl), —OSO$_2$($C_1$-$C_{14}$ alkyl, aryl or aralkyl), —H, —Cl, —F, —OH, —R, or —RK, where RK=unbranched polyether radical composed of alkylene oxide units having 1-6 carbon atoms, or aliphatic and/or cycloaliphatic and/or aromatic polyester radical having a weight-average molecular weight of between 200 and 4000 g/mol and R=polyhydroxy-functional branched polyglycidol polyether radical, which consists of a branched polyglycidol group or contains the latter, $R^4 = C_1-C_{14}$ alkyl, aryl or aralkyl, B=2-300, preferably 10-200, more preferably 15-100.

These compounds correspond to the compounds represented in the general formula (I) for the case A=0 and C=0 for the case that at least one of the two substituents $R^2$ and $R^3$ is a polyhydroxy-functional branched polyglycidol polyether radical, which consists of a branched polyglycidol group or contains the latter.

Particularly preferred compounds are the compounds of the general formula (IV) for which $R^2=R^3=R$. On the basis of the terminal polyhydroxy-functional branched polyether radicals, they display improved activity in many cases. They can be employed with advantage in coating compositions, polymeric moulding compounds and thermoplastics that do not require any compatibility adaptation by means of radicals RK.

The Si—H-functional alkylpolysiloxanes used may also be strictly monofunctional; in other words, they may have only one silane hydrogen atom. With these compounds it is possible to produce preferred compounds in which exactly one of the groups $R^2$ and $R^3$ stands for a radical R. The Si—H-functional alkylpolysiloxanes may be represented, for example, by the following general formula (V):

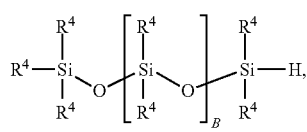

(V)

for which the abovementioned definitions of $R^4$ and B apply. These compounds yield polyhydroxy-functional polysiloxanes of the general formula (VI)

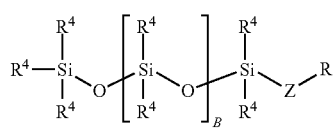

(VI)

These linear monofunctional polysiloxanes can be synthesized, for example, via living anionic polymerization of cyclic polysiloxanes. This process is described, inter alia, in T. Suzuki, Polymer, 30 (1989) 333. The reaction is depicted exemplarily in the following reaction scheme:

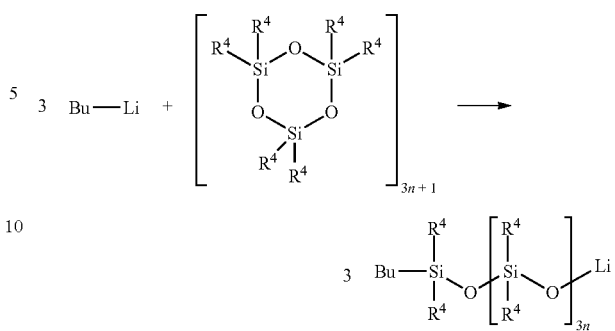

The SiH($R^4$)$_2$ functionalization of the end group can take place with functional chlorosilanes, dialkyl-chlorosilane for example, in analogy to the following reaction scheme, by a process known to the person of ordinary skill in the art.

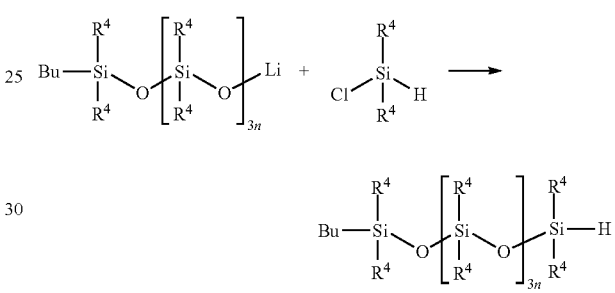

A further possibility for the preparation of linear, monofunctional polysiloxanes is the equilibration of cyclic and open-chain polydialkylsiloxanes with terminally Si—H-difunctional polydialkylsiloxanes, as described in Noll (Chemie and Technologie der Silicone, VCH, Weinheim, 1984). For statistical reasons the reaction product is composed of a mixture of cyclic, difunctional, monofunctional and non-functional siloxanes. The fraction of linear siloxanes in the reaction mixture can be increased by distillative removal of the lower cyclic species. Within the linear polysiloxanes the fraction of SiH($R^4$)$_2$-monofunctional polysiloxanes in the equilibration reaction product ought to be exceedingly high. If mixtures of linear polysiloxanes are used, the activity of the later products of the invention follows the rule whereby this activity increases as the fraction of monofunctional end products of the invention increases. When mixtures are used, the fraction of the monofunctional end products of the invention ought preferably to be the greatest fraction in the mixture and ought more preferably to amount to more than 40% by weight. Typical equilibration products depleted of cyclic impurities contain preferably less than 40% by weight of difunctional and less than 15% by weight of non-functional linear polysiloxanes, the latter being present in particular at less than 5% by weight, and ideally not at all.

One example of a polyhydroxy-functional polysiloxane of the invention with terminal functionalization, comprising a polysiloxane having terminal Si—H groups, is shown by the following formula (VII):

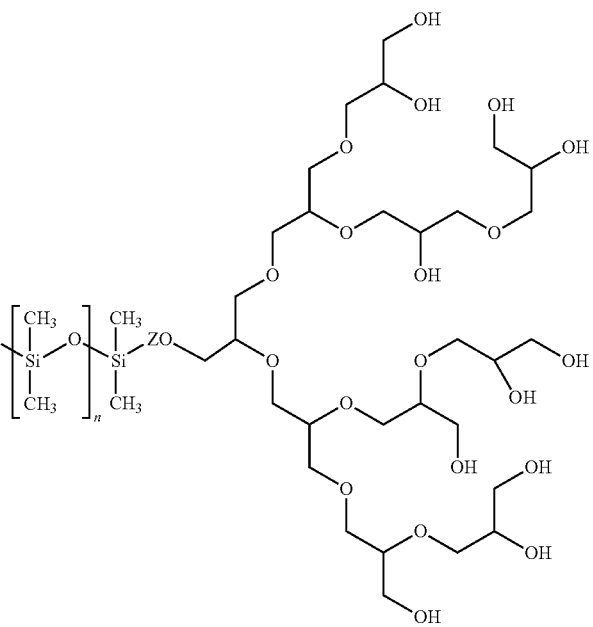

(VII)

A reaction example of a monofunctional silicone having a branched polyether radical is shown by the following formula (VIII):

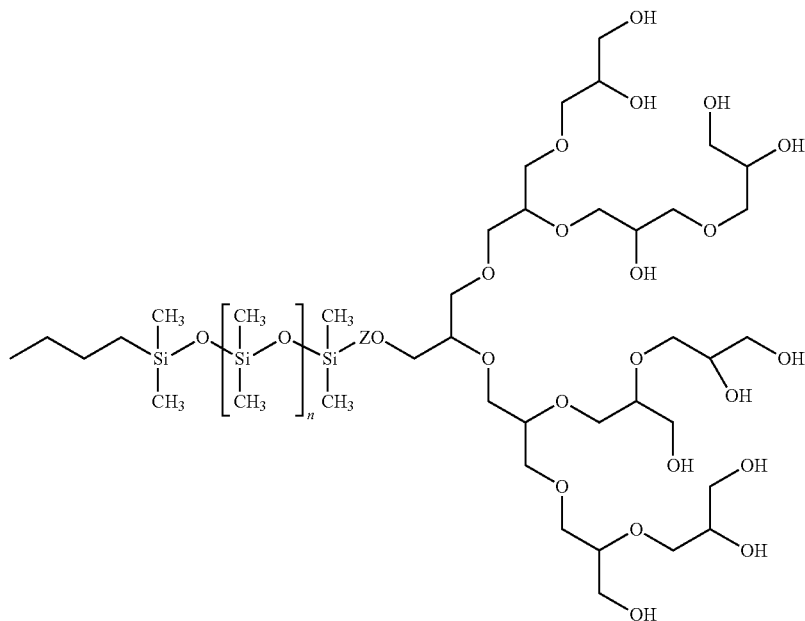

(VIII)

Typically the hydrosilylation takes place under the following conditions: the Si—H-functional alkyl-polysiloxane is introduced at room temperature. Then, an acid-buffering agent is added, in order to suppress any secondary condensation reactions. The acid-buffering agent can, for example, be sodium acetate or potassium acetate in amounts of 25 to 200 ppm. Depending on the anticipated heat given off by the reaction, a portion or the entirety of the allyl compounds is added. It is advantageous if additionally a solvent is used which allows homogeneous mixing of the allyl compound with the Si—H-functional polysiloxane. The solvent or solvents is or are preferably selected such as to give a homogeneous solution both of the allyl and/or methallyl compounds used in accordance with the invention and of the Si—H-alkyl-polysiloxane in the reaction mixture. Examples of suitable solvents include cyclic ethers, glycol ethers, alcohols and/or mixtures of these solvents with aliphatic and/or aromatic hydrocarbons. Particular preference among these is given to secondary alcohols such as, for example, isopropanol, isobutanol and/or propylene glycol methyl ether. Through the homogenizing effect, the solvents further contribute to the production of products possessing particular homogeneity. Under a nitrogen atmosphere the contents of the reactor are then heated, for example, to 75° C. to 80° C. At this point a catalyst is added, such as a transition metal, nickel for example, nickel salts, iridium salts or, preferably, a compound of a noble metal from group VIII, such as hexachloroplatinic acid or cisdiammineplatinum(II) dichloride. The exothermic reaction which then takes place raises the temperature. Normally an attempt is made to keep the temperature within a range from 90° C. to 120° C. If there is still a portion of the allyl compounds to be metered in, the addition takes place in such a way that the temperature of 90° C. to 120° C. is not exceeded, but also such that the temperature does not drop below 70° C. Following complete addition, the temperature is held at 90° C. to 120° C. for a certain time. The course of the reaction can be monitored by a gas-volumetric determination of the remaining Si—H groups or by infrared spectroscopy for the disappearance of the silicon hydride absorption band (Si—H: 2150 cm$^{-1}$).

The polyhydroxy-functional polysiloxanes of the invention can also be subsequently modified chemically in order, for example, to bring about certain compatibilities with binders. The modifications may be an acetylation, a methylation or a reaction with monoisocyanates. In addition, by reaction with carboxylic anhydrides, such as with phthalic anhydride or succinic anhydride, for example, it is possible to install acid functions. The hydroxyl groups in this case may be partially or fully reacted. By reaction with corresponding unsaturated anhydrides, maleic anhydride for example, it is possible to install not only a carboxyl group but also one or more reactive double bonds into the molecule. The hydroxyl functions in this case may also be reacted with structurally different anhydrides. In order to achieve better solubility in water, the carboxyl groups may also be salified with alkanolamines. A further possibility, through subsequent acrylation or methacrylation on the hydroxyl groups, is to obtain products which can be installed firmly into coating systems even in radiation-curing operations, such as UV curing and electron-beam curing. The hydroxyl groups can also be esterified by ring-opening polymerization with propiolactone, caprolactone, valerolactone or dodecalactone, and derivatives thereof. With particular preference the ring-opening polymerization takes place with caprolactone. Both pure polyesters and mixed polyesters can be prepared here. In the case of mixed polyesters the esterification can be blockwise, alternating or random. It is also possible for the mixed polyesters to contain a distribution gradient in respect of the esterification.

The invention further provides coating compositions, polymeric moulding compounds and thermoplastics comprising the polyhydroxy-functional polysiloxanes of the invention.

The coating compositions, polymeric moulding compounds and thermoplastics produced using the polyhydroxy-functional polysiloxanes of the invention may be used in pigmented or unpigmented form and may also comprise fillers such as calcium carbonate, aluminium hydroxide, reinforcing fibres such as glass fibres, carbon fibres and aramid fibres. Furthermore, the coating compositions, polymeric moulding compounds and thermoplastics produced using the polyhydroxy-functional polysiloxanes of the invention may comprise other customary additives, such as wetting agents and dispersants, light stabilizers, ageing inhibitors and the like, for example.

The coating compositions produced using the polyhydroxy-functional polysiloxanes of the invention preferably comprise at least one binder. The coating compositions produced using the polyhydroxy-functional polysiloxanes of the invention are preferably coating compositions for producing anti-graffiti coatings, release coatings, self-cleaning façade coatings, ice-repelling coatings (for aircraft, for example), car wheel coatings, dirt-repelling machine and instrument coatings, marine coatings (anti-fouling coatings), and dirt-repelling furniture coatings and release-paper coatings. Owing to the very good compatibility of the polyhydroxy-functional polysiloxanes, they are also outstandingly suitable for producing transparent coatings.

The coating compositions and polymeric moulding compounds of the invention contain the polyhydroxy-functional polysiloxane additives in amounts of 0.1% to 10% by weight, preferably of 0.5% to 7.5% by weight, with very particular preference of 1% to 5% by weight, based on the solids content of the coating composition or polymeric moulding compound. The polyhydroxy-functional polysiloxanes are preferably added as solution or emulsions to the coating compositions or polymeric moulding compounds of the invention.

The thermoplastics of the invention contain the polyhydroxy-functional polysiloxane additives in amounts of 0.1% to 5% by weight, preferably of 0.2% to 2.0% by weight, with very particular preference of 0.5% to 1% by weight, based on the solids content of the thermoplastic. The polyhydroxy-functional polysiloxanes are preferably added as solids to the thermoplastics of the invention.

The coating compositions produced using the polyhydroxy-functional polysiloxanes of the invention may be applied to a large number of substrates, such as wood, paper, glass, ceramic, plaster, concrete and metal, for example. In a multi-coat process the coatings may also be applied to primers, primer-surfacers or base coats. Curing of the coating compositions depends on the particular type of crosslinking and may take place within a wide temperature range of, for example, −10° C. to 250° C. Surprisingly, the coating compositions produced using the polyhydroxy-functional polysiloxanes of the invention display very good anti-adhesive dirt-repelling properties even when cured at room temperature. Furthermore, the coating compositions produced using the polyhydroxy-functional polysiloxanes of the invention exhibit good antistatic properties.

Owing to the extraordinarily good anti-adhesive effect of the coating compositions of the invention, even oily substances such as mineral oils, vegetable oils or oily preparations for example, are repelled so enabling full discharge from correspondingly coated oil-containing vessels. Accordingly, the coating compositions thus additized are also suitable for can interior coatings and drum interior coatings. On the basis of the antistatic properties of the coating compositions additized accordingly, they are suitable for use whenever disadvantageous effects caused by electrostatic charging are to be avoided.

The polymeric moulding compounds produced using the polyhydroxy-functional polysiloxanes of the invention are preferably lacquer resins, alkyd resins, polyester resins, epoxy resins, polyurethane resins, unsaturated polyester resins, vinyl ester resins, polyethylene, polypropylene, polyamides, polyethylene terephthalate, PVC, polystyrene, polyacrylonitrile, polybutadiene, polyvinyl chloride or blends of these polymers.

The thermoplastics produced using the polyhydroxy-functional polysiloxanes of the invention are poly(meth)acrylates, polyacrylonitrile, polystyrene, styrenic plastics (e.g. ABS, SEBS, SBS), polyesters, polyvinyl esters, polycarbonates, polyethylene terephthalate, polybutylene terephthalate, polyamides, thermoplastic polyurethanes (TPU), polyvinyl chloride, polyoxymethylene, polyethylene or polypropylene. The thermoplastics may be filled and/or pigmented. The term "thermoplastics" in the sense of the invention also embraces blends of different kinds of thermoplastics. The thermoplastics may also, for example, be spinnable thermoplastic fibres known to a person of ordinary skill in the art, such as polyester fibres or polyamide fibres, for example.

The examples below illustrate the invention without restrictive effect:

Starting Compound A: Preparation of an Unbranched Allyl Polyether

The alcohol to be alkoxylated (e.g. allyl alcohol, ethylene glycol monoallyl ether) is transferred to a suitable autoclave together with a catalyst customary for the alkoxylation. Customary catalysts are, for example, KOH or NaOH. Dewatering may take place under reduced pressure at the appropriate temperature. Subsequently, after thorough flushing with nitrogen, at a temperature of approximately 120-140° C., the desired amount of oxide (e.g. ethylene oxide or propylene oxide) is added in such a way that the pressure in the reactor does not exceed a maximum of 5 bar. After the end of addition of the quantity of oxide and after a subsequent time for after-reaction, any unreacted alkylene oxide present is removed under reduced pressure. The product is subsequently cooled and the catalyst is neutralized with a suitable acid, acetic acid, for example, and, where appropriate, the salt formed is removed by filtration.

Starting Compounds B and B': Preparation of Branched Allyl Polyglycidol Polyethers (with and without Linear Polyether Spacers)

Reaction of an Allyl Polyether Having the Mean Average Formula Allyl-(EO)$_4$—H (Allyltetraethylene Glycol) with Glycidol (Compound B; Allyl Polyether 6)

A 250 ml 4-necked flask with stirrer, thermometer and distillation bridge is charged at room temperature with 76.0 g of allyltetraethylene glycol and 1.82 g of potassium tert-butoxide, and this initial charge is heated to 90° C. under a nitrogen atmosphere and stirred for 1 hour under a reduced pressure of 60 mbar. The temperature is subsequently raised to 110° C. and 72.18 g of glycidol are added dropwise by means of a dropping funnel over the course of 3 hours. After the end of the metered feed, stirring is continued at 110° C. for 3 hours more. A degree of conversion of 100% was found on checking of the conversion via NMR. After cooling to 50° C., the product is neutralized over ion exchangers.

Reaction of 2-propen-1-ol (allyl alcohol) with Glycidol (Compound B')

The polyglycidol is prepared starting from allyl alcohol but synthesized in the same way as for those prepared starting from allyl polyether. On account of the lower boiling point of allyl alcohol relative to allyl polyethers, it is more practical to operate using potassium or sodium alkoxides as catalysts (e.g. potassium methoxide), since the alcohol liberated (e.g. methanol) is easier to remove, on account of the lower boiling point.

EXAMPLE 1

Reaction of a Methylhydrosiloxane Having the Mean Average Formula $M^H D_{22} M^H$ and Allyl Polyether 1

A 250 ml 3-necked flask with stirrer, thermometer, and reflux condenser is charged at room temperature with 90.5 g of a methylhydrosiloxane having the mean average formula $M^H D_{22} M^H$ and 40.80 g of allyl polyether 1 and 0.09 g of potassium acetate solution (10% strength in ethanol) is heated under a nitrogen atmosphere to 80° C. When this temperature has been reached, 0.066 g of Speier's catalyst (6% strength by weight solution in isopropanol) is added. The temperature is increased to 110° C. and the mixture was held for 120 minutes under these conditions. Gas-volumetric determination of the remaining Si—H group indicates a degree of conversion of 100%.

EXAMPLE 2

Reaction of a Methylhydrosiloxane Having the Mean Average Formula $M^H D_{66} D^H{}_2 M^H$ and Allyl Polyether RK and Allyl Polyether 3

A 250 ml 3-necked flask with stirrer, thermometer, and reflux condenser is charged at room temperature with 67.4 g of a methylhydrosiloxane having the mean average formula $M^H D_{66} D^H{}_2 M^H$, 31.4 g of allyl polyether RK and 21.1 g of allyl polyether 3 and 0.18 g of potassium acetate solution (10% by weight in ethanol) and 80.0 g of Dowanol PM and this initial charge is heated under a nitrogen atmosphere to 80° C. When this temperature has been reached, 0.042 g of Speier's catalyst (6% strength by weight solution in isopropanol) is added. Thereafter the temperature is raised to 100° C. and held for 4 hours. Gas-volumetric determination of the remaining Si—H groups indicates complete conversion.

EXAMPLE 3

Reaction of a Methylhydrosiloxane Having the Mean Average Formula $M^H D_{66} D^H{}_2 M^H$ and Allyl Polyether RK and Allyl Polyether 2

A 250 ml 3-necked flask with stirrer, thermometer, and reflux condenser is charged at room temperature with 71.5 g of a methylhydrosiloxane having the mean average formula $M^H D_{66} D^H{}_2 M^H$, and 15.1 g of allyl polyether 2 and 0.18 g of potassium acetate solution (10% by weight in ethanol) and 80.0 g of Dowanol PM and this initial charge is heated under a nitrogen atmosphere to 80° C. When this temperature has been reached, 0.042 g of Speier's catalyst (6% strength solution in isopropanol) is added. Thereafter the temperature is raised to 100° C. and held for 0.5 hour. 33.3 g of allyl polyether RK are added and stirred for a further 3.5 hours at 100° C. Gas-volumetric determination of the remaining Si—H group indicates complete conversion.

EXAMPLE 4

Reaction of a Methylhydrosiloxane Having the Mean Average Formula $BuD_{18} M^H$ (Prepared by Ring-Opening Polymerization of D3) and Allyl Polyether 6

A 250 ml 3-necked flask with stirrer, thermometer, and reflux condenser is charged at room temperature with 108.9 g of a methylhydrosiloxane having the mean average formula $BuD_{18} M^H$, 41.1 g of allyl polyether 6, 50.0 g of Dowanol PM and 0.3 g of potassium acetate solution (10% by weight in ethanol) and this initial charge is heated under a nitrogen atmosphere to 80° C. When this temperature has been reached, 0.045 g of Speier's catalyst (6% strength by weight solution in isopropanol) is added. Thereafter the temperature is raised to 100° C. and held for 2 hours. Gas-volumetric determination of the remaining Si—H group after this time has elapsed indicates complete conversion.

EXAMPLE 5

Reaction of a Methylhydrosiloxane Having the Mean Average Formula $M^HD_{66}D^H{}_2M^H$ and Allyl Polyether RK and Allyl Polyether 4

A 250 ml 3-necked flask with stirrer, thermometer, and reflux condenser is charged at room temperature with 69.8 g of a methylhydrosiloxane having the mean average formula $M^HD_{66}D^H{}_2M^H$, 17.6 g of allyl polyether 4, 0.18 g of potassium acetate solution (10% by weight in ethanol) and 80.0 g of Dowanol PM and this initial charge is heated under a nitrogen atmosphere to 80° C. When this temperature has been reached, 0.042 g of Speier's catalyst (6% strength by weight solution in isopropanol) is added. Thereafter the temperature is raised to 100° C. and held for 0.5 hour. 32.5 g of allyl polyether RK are added and stirred for a further 4.5 hours at 100° C. Gas-volumetric determination of the remaining Si—H group indicates a degree of conversion of 100%.

EXAMPLE 6

Reaction of a Methylhydrosiloxane Having the Mean Average Formula $M^HD_{66}D^H{}_2M^H$ and Allyl Polyether RK and Allyl Polyether 5

A 250 ml 3-necked flask with stirrer, thermometer, and reflux condenser is charged at room temperature with 64.2 g of a methylhydrosiloxane having the mean average formula $M^HD_{66}D^H{}_2M^H$, 25.7 g of allyl polyether 5, 0.18 g of potassium acetate solution (10% by weight in ethanol) and 80.0 g of Dowanol PM and this initial charge is heated under a nitrogen atmosphere to 80° C. When this temperature has been reached, 0.042 g of Speier's catalyst (6% strength by weight solution in isopropanol) is added. Thereafter the temperature is raised to 100° C. and held for 0.5 hour. 29.9 g of allyl polyether RK are added and stirred for a further 4.5 hours at 100° C. Gas-volumetric determination of the remaining Si—H group indicates a degree of conversion of 100%.

EXAMPLE 7

Reaction of a Methylhydrosiloxane Having the Mean Average Formula $M^HD_{75}M^H$ and Allyl Polyether 6

A 250 ml 3-necked flask with stirrer, thermometer, and reflux condenser is charged at room temperature with 125.0 g of a methylhydrosiloxane having the mean average formula $M^HD_{75}M^H$, 25.0 g of allyl polyether 6, 0.3 g of potassium acetate solution (10% by weight in ethanol) and 50.0 g of Dowanol PM and this initial charge is heated under a nitrogen atmosphere to 80° C. When this temperature has been reached, 0.045 g of Speier's catalyst (6% strength by weight solution in isopropanol) is added. Thereafter the temperature is raised to 100° C. and held for 3 hours. Gas-volumetric determination of the remaining Si—H group indicates a degree of conversion of 100%.

EXAMPLE 8

Reaction of a Methylhydrosiloxane Having the Mean Average Formula $BuD_{68}M^H$ (Prepared by Ring-Opening Polymerization of D3) and Allyl Polyether 3

A 250 ml 3-necked flask with stirrer, thermometer, and reflux condenser is charged at room temperature with 116.7 g of a methylhydrosiloxane having the mean average formula $BuD_{68}M^H$, 13.3 g of allyl polyether 3, 0.26 g of potassium acetate solution (10% by weight in ethanol) and 70.0 g of toluene and this initial charge is heated under a nitrogen atmosphere to 80° C. When this temperature has been reached, 0.039 g of Speier's catalyst (6% strength by weight solution in isopropanol) is added. Thereafter the temperature is raised to 100° C. and held for 2 hours. Gas-volumetric determination of the remaining Si—H group indicates a degree of conversion of 100%.

EXAMPLE 9

Reaction of a Methylhydrosiloxane Having the Mean Average Formula $M^HD_{46}M^H$ and Allyl Polyether 2

A 250 ml 3-necked flask with stirrer, thermometer, and reflux condenser is charged at room temperature with 100.9 g of a methylhydrosiloxane having the mean average formula $M^HD_{46}M^H$, 29.1 g of allyl polyether 2, 0.26 g of potassium acetate solution (10% by weight in ethanol) and 70.0 g of toluene and this initial charge is heated under a nitrogen atmosphere to 80° C. When this temperature has been reached, 0.039 g of Speier's catalyst (6% strength by weight solution in isopropanol) is added. Thereafter the temperature is raised to 100° C. and held for 2 hours. Gas-volumetric determination of the remaining Si—H group indicates a degree of conversion of 100%.

EXAMPLE 10

Reaction of a methylhydrosiloxane having the mean average formula $M^HD_{66}D^H{}_2M^H$ and allyl polyether 8

A 250 ml 3-necked flask with stirrer, thermometer, and reflux condenser is charged at room temperature with 72.5 g of a methylhydrosiloxane having the mean average formula $M^HD_{66}D^H{}_2M^H$, 57.5 g of allyl polyether 8, and also 0.19 g of potassium acetate solution (10% by weight in ethanol) and 43.3 g of Dowanol PM and this initial charge is heated under a nitrogen atmosphere to 80° C. When this temperature has been reached, 0.045 g of Speier's catalyst (6% strength by weight solution in isopropanol) is added. Thereafter the temperature is raised to 100° C. and held for 2 hours. Gas-volumetric determination of the remaining Si—H groups indicates a complete conversion.

EXAMPLE 11

Reaction of a Methylhydrosiloxane Having the Mean Average Formula $M^HD_{66}D^H{}_2M^H$ and Allyl Polyether 7

A 250 ml 3-necked flask with stirrer, thermometer, and reflux condenser is charged at room temperature with 84.6 g of a methylhydrosiloxane having the mean average formula $M^HD_{66}D^H{}_2M^H$, 45.4 g of allyl polyether 7, and also 0.19 g of potassium acetate solution (10% by weight in ethanol) and 43.3 g of Dowanol PM and this initial charge is heated under a nitrogen atmosphere to 80° C. When this temperature has been reached, 0.045 g of Speier's catalyst (6% strength by weight solution in isopropanol) is added. Thereafter the temperature is raised to 100° C. and held for 2 hours. Gas-volumetric determination of the remaining Si—H groups indicates a complete conversion.

Key

For the methylhydrosiloxanes indicated above, the definitions of the abbreviations given are defined as follows:

M=—$O_{0.5}Si(CH_3)_3$
$M^H$=—$O_{0.5}SiH(CH_3)_2$
D=—$O_{0.5}Si(CH_3)_2O_{0.5}$—
$D^H$=—$O_{0.5}SiH(CH_3)O_{0.5}$—
D3=hexamethylcyclotrisiloxane
Bu=butyl- Abbreviations additionally used:

Allyl polyether 1=
Allyl alcohol with an average of 3.3 mol of glycidol
OH number=791 mg KOH/g
Iodine number=84.1 g $I_2$/100 g Allyl polyether 2=
Allyl glycol with an average of 3.4 mol of glycidol
OH number=704 mg KOH/g
Iodine number=72.6 g $I_2$/100 g Allyl polyether 3=
Allyl glycol with an average of 7.4 mol of glycidol
OH number=730 mg KOH/g
Iodine number=38.9 g $I_2$/100 g Allyl polyether 4=
Allyl alcohol with an average of 6.4 mol of glycidol
OH number=766.8 mg KOH/g
Iodine number=48.3 g $I_2$/100 g Allyl polyether 5=
Allyl alcohol with an average of 10.7 mol of glycidol
OH number=764.3 mg KOH/g
Iodine number=30.4 g $I_2$/100 g Allyl polyether 6=
Allyl tetraethylene glycol with an average of 3.2 mol of glycidol
OH number=502 mg KOH/g
Iodine number=52.6 g $I_2$/100 g Allyl polyether 7=
Allyl alcohol with an average of 4 mol of glycidol ethoxylated with 5 mol of EO
(1 mol of EO per OH group)
OH number=522 mg KOH/g
Iodine number=45 g $I_2$/100 g Allyl polyether 8=
Allyl alcohol with an average of 4 mol of glycidol ethoxylated with 10 mol of EO
(2 mol of EO per OH group)
OH number=426 mg KOH/g
Iodine number=30.5 g $I_2$/100 g Allyl polyether RK=
Unbranched allyl polyether, ethylene oxide-propylene oxide polyether prepared starting from allyl alcohol, with 75 mol % of ethylene oxide and 25 mol % of propylene oxide,
Molecular weight approximately 750 g/mol
OH number=74.5 mg KOH/g
Iodine number=30.5 g I/100 g Speiers's Catalyst=$H_2[PtCl_6]0.6\ H_2O$
Dowanol PM=1-methoxy-2-propanol Performance Testing of the Polyhydroxy-Functional Polysiloxanes of the Invention The polyhydroxy-functional polysiloxanes of the invention were performance-tested in a number of varnish systems. Aqueous 2-component system based on Bayhydrol VP LS 2235/Bayhydur 3100

| Component 1 (base varnish): | |
|---|---|
| Bayhydrol VP LS 2235[1] | 70.90 |
| BYK-011[2] | 1.40 |
| Water | 1.10 |
| The mixture is homogenized by stirring. | |
| Component 2 (curing agent): | |
| Bayhydur 3100[3] | 22.00 |
| Dowanol PMA | 4.60 |
| The mixture is homogenized by stirring. | |

[1] Polyacrylate dispersion, Bayer Material Science AG, D-Leverkusen
[2] Defoamer, BYK-Chemie GmbH, D-Wesel
[3] Isocyanate-based curing component, Bayer Material Science AG, D-Leverkusen Base varnish and curing solution are prepared independently of one another. The additives of the invention and the comparison products are stirred into the base varnish in a concentration of 1% by weight of active substance based on the total varnish.

Shortly before application, base varnish and curing solution are mixed in a ratio of 100:36.2. The viscosity is adjusted by adding water to a flow time of 30 seconds in the DIN 4 mm cup.

Following incorporation, the additized varnishes are applied to a primed aluminium panel in a 100 μm wet film using a wire-wound coating rod. Thereafter the panels are dried at room temperature for 60 hours. The dried panels are subsequently subjected to the tests specified below.

Water-Thinable Acrylate/Melamine Baking System Based on Neocryl XK101 and Cymel 303

| | |
|---|---|
| Neocryl XK 101[4] | 78.90 |
| Water | 6.20 |
| Cymel 303[5] | 8.30 |
| NMP | 6.20 |
| DMEA | 0.40 |

[4] Acrylate emulsion, DSM neoresins, NL-Wallwijk
[5] Crosslinker, Cytec Industries Inc., USA-West Paterson, NJ All of the components are mixed and the mixture is homogenized for 10 minutes with a dissolver at a peripheral speed of 5 m/s. The additives for testing are incorporated into the varnish at a concentration of 1% active substance over 10 minutes, using a Scandex shaker.

Following incorporation, the additized varnishes are applied to a primed aluminium panel in a 100 μm wet film using a wire-wound coating rod. After a flash-off time of 30 minutes at room temperature, the panels are baked in a forced-air oven at 130° C. for 30 minutes.

The coating films obtained are tested for their dirt, water and oil repellency in accordance with the following criteria:

Edding Test:

The film surface is inscribed with an Edding 400 permanent marker and a visual assessment is made of whether the surface can be written on. An assessment is made of whether the ink spreads on the surface, or contracts. After the ink has dried, an attempt is made to remove it by wiping with a dry cloth.

Evaluation: 1-5

1=ink contracts, can be removed without residue using a paper cloth

5=ink spreads very well on the substrate, and is virtually impossible to remove

Bitumen Test:

Bitumen is heated until it is sufficiently liquefied to be able to be applied to the film surface. After the bitumen mass has cooled, a visual assessment is made of how effectively it can be detached again from the surface manually without residue.

Evaluation: 1-5:

1=bitumen can be removed easily and without residue

5=bitumen adheres firmly to the surface and is virtually impossible to remove

Staining with Bayferrox Powder:

3 spoonfuls of Bayferrox 130M iron oxide pigment from Bayer AG are scattered onto the film surface and rinsed off again using distilled water in 5 squirts using a wash bottle. The surface, free of residue as far as possible, is assessed visually.

Evaluation: 1-5:

1=Bayferrox powder can be washed off with water without residue

5=no cleaning effect on rinsing with water; a large red spot remains

Water Run-Off Test:

One drop of water is placed on the surface. The coated film surface is then inclined until the drop runs off. A visual assessment is made of the angle at which the drop runs off and of whether the drop runs off without residue.

Evaluation: 1-5:

1=small angle is sufficient for the drop to run off completely without forming a tear and without residual droplets 5=coated panel has to be inclined sharply until the drop runs off, with residues of water possibly remaining on the film surface Mineral Oil Run-Off Test:

One drop of commercially customary mineral oil is placed on the film surface. The coated film surface is then inclined until the drop has run about 10 cm. After 5 minutes, the oil track or drop reformation is evaluated visually.

Evaluation: 1-5:

1=the oil track immediately reforms into individual drops

5=the oil track does not reform, but instead possibly spreads further

Aqueous 2-Component System Based on Bayhydrol VP LS 2235/Bayhydur 3100:

|  | Oil | Water | Bitumen | Edding | Edding (after wipe-off) |
|---|---|---|---|---|---|
| Control sample | 5 | 4 | 5 | 5 | 5 |
| Example 1 | 3 | 1 | 1 | 3 | 2 |
| Example 2 | 1 | 1 | 1 | 1 | 1 |
| Example 3 | 1 | 1 | 1 | 1 | 1 |
| Example 4 | 1 | 1 | 1 | 1 | 1 |
| Example 7 | 2 | 1 | 1 | 1 | 1 |
| Tego Protect 5100 | 1 | 2 | 1 | 4 | 2 |
| Worlee Add 720 | 3 | 2 | 3 | 5 | 5 |

Worlee Add 720: modified phenoldimethylsiloxane for producing aqueous and solvent-borne anti-graffiti coatings (Worlee-Chemie, D-Hamburg)

Water-Thinnable Acrylate/Melamine Baking System Based on Neocryl XK101 and Cymel 303:

|  | Bayferrox | Oil | Water | Bitumen | Edding | Edding (after wipe-off) |
|---|---|---|---|---|---|---|
| Control sample | 3 | 5 | 4 | 5 | 5 | 5 |
| Example 1 | 1 | 1 | 1 | 1 | 3 | 1 |
| Example 2 | 1 | 1 | 1 | 1 | 3 | 1 |
| Example 3 | 2 | 1 | 1 | 1 | 1 | 1 |
| Example 5 | 1 | 1 | 1 | 1 | 1 | 1 |
| Example 6 | 1 | 1 | 1 | 1 | 1 | 1 |
| Example 10 | 1 | 1 | 1 | 1 | 1 | 1 |
| Example 11 | 1 | 1 | 1 | 1 | 1 | 1 |
| Worlee Add 720 | 5 | 2 | 2 | 1 | 1 | 2 |

Worlee Add 720: modified phenoldimethylsiloxane for producing aqueous and solvent-borne anti-graffiti coatings, 50% strength solution in solvent mixture (Worlee-Chemie, D-Hamburg)

Performance Testing of the Polyhydroxy-Functional Polysiloxanes of the Invention in Polymeric Moulding Compounds A 50% strength solution in 1-methoxy-2-propanol is prepared of the polyhydroxy-functional polysiloxane from Examples 2, 5 and 9. This polysiloxane solution is converted in accordance with the table below into the polymeric moulding compounds A and B (gel coat mixture A and gel coat mixture B).

Gel Coat Formulation:

| Palatal 400-01 | 84.75%, polyester resin, DSM resins |
|---|---|
| Aerosil 200 | 1.25%, fumed silica, Degussa |
| Tronox R-KB-2 | 10.00%, titanium dioxide, Tronox |
| Beschleuniger NL-49 P | 1.00%, cobalt octoate accelerant, 1% strength, Akzo Nobel |
| Styrene | 8.00% |

Palatal 400-01, Tronox R-KB-2 and Aerosil 200 are premixed using a dissolver at approximately 2800 rpm for five minutes. Thereafter, before the Beschleuniger NL49 P is used, the styrene is mixed in at 900 rpm. In the case of gel coat mixture A, the polysiloxane solution from Example 3 is added as well.

Formulation (in percent by weight) for the gel coat mixtures tested:

|  | Gel Coat Mixture A | Gel Coat Mixture B |
|---|---|---|
| Gel coat | 98.5 | 98 |
| Beschleuniger NL-49 P | 1 | 2 |
| Polysiloxane solution from Example 2 | 0.5 | 0 |
| Polysiloxane solution from Example 5 | 0.5 | 0 |
| Polysiloxane solution from Example 9 | 0.5 | 0 |

The anti-adhesive properties of these gel coat mixtures are determined by the adhesion of these gel coats to glass plates.

For this purpose, glass plates measuring 40×10×0.05 cm are first of all thoroughly degreased by washing with ethyl acetate.

Subsequently the gel coat mixtures A and B are applied to the glass plate using a frame-type coating bar (750 μm slot). All of the gel coats are left to cure at room temperature overnight. After curing, the gel coat is removed from the plate using a carpet knife.

Result

Gel coat mixture B cannot be removed from the glass plate. The gel coat mixture A, equipped with an internal release agent, is easy to remove from the cleaned glass plate. The surface of the gel coat mixture A, equipped with an internal release agent, from the cleaned glass plate is absolutely smooth and exhibits a high gloss.

Performance Testing of the Polyhydroxy-Functional Polysiloxanes of the Invention in Thermoplastics 0.05 g of each of the products from Examples 2, 5, 8 and 9 were dissolved each in 100 g of a 10% strength solution of polymethyl methacrylate in n-ethyl acetate. A film 200 μm thick was produced in each case on a glass plate measuring 100×250 mm. Removal of the solvent gave a coating having a film thickness of approximately 20 μm. As a sample for comparison, a corresponding coating on glass without additive was used. In order to measure the sliding resistance, an electric film applicator device with constant rate of advance was used. A tensile force transducer which, via a computer, records any resistance which opposes the sliding body was fixed on the mount for the film applicator device. The sliding body is moved in the drawing direction over the surface to be measured. The sliding body used was a 500 g weight having a defined felt bottom layer.

The transparency/clouding of the coating was assessed purely by visual means.

| Sample | Percentage reduction in the friction coefficient | Transparency |
|---|---|---|
| Control sample without additive | — | transparent |
| Example 2 | 71% | transparent |
| Example 5 | 66% | transparent |
| Example 8 | 76% | transparent |
| Example 9 | 71% | transparent |

The invention claimed is:

1. A process for preparing polyhydroxy-functional polysiloxanes comprising branched polyglycidol polyether radicals and having the general formula

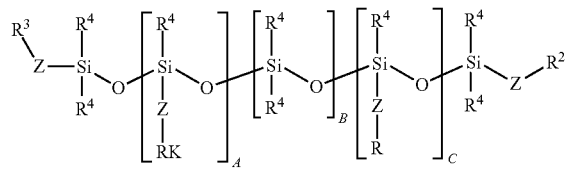

where

Z=$C_1$-$C_{14}$ alkylene,

RK=unbranched polyether radical composed of alkylene oxide units having 1-6 carbon atoms, and/or aliphatic and/or cycloaliphatic and/or aromatic polyester radical having a weight-average molecular weight of between 200 and 4000 g/mol, R=polyhydroxy-functional branched polyglycidol polyether radical, which consists of a branched polyglycidol group or contains a branched polyglycidol group, $R^2$ and $R^3$ independently of one another are $C_1$-$C_{14}$ alkyl aryl or aralkyl, —O($C_1$-$C_{14}$ alkyl, aryl or aralkyl), —OCO($C_1$-$C_{14}$ alkyl, aryl or aralkyl), —O—CO—O ($C_1$-$C_{14}$ alkyl, aryl or aralkyl), —O$SO_2$($C_1$-$C_{14}$ alkyl, aryl or aralkyl), —H, —Cl, —F, —OH, —R, or —RK, $R^4$=$C_1$-$C_{14}$ alkyl, aryl or aralkyl,

A=1-20,

B=2-300, and

C=0-20;

and if C=0 then $R^3$=R and/or $R^2$=R, wherein at least one allylic or methallylic starter compound is reacted with at least one glycidol or glycidol carbonate such that an allyl polyether or methallyl polyether modified with one or more branched polyglycidol radicals is formed, and then the allyl polyether or polyethers or methallyl polyether or polyethers thus prepared is or are subjected to addition reaction with an Si—H-functional alkyl polysiloxane in the presence of an acid-buffering agent.

2. The process according to claim 1, where the allylic or methallylic starter compound is selected from the group consisting of allyl alcohol, methallyl alcohol, an alkoxylated allyl alcohol or methallyl alcohol, and an allyl alcohol or methallyl alcohol etherified with a diol or polyol.

3. The process according to claim 2, where the alkoxylated allyl alcohol or methallyl alcohol is an ethoxylated, propoxylated or butoxylated or mixedly ethoxylated and propoxylated allyl alcohol or methallyl alcohol, and the diol or polyol is selected from the group consisting of dihydroxylated and polyhydroxylated ethers, esters, polyethers and polyesters.

4. The process according to claim 1, wherein the unbranched allyl polyethers, methallyl polyethers, allyl polyesters and/or methallyl polyesters are subjected to addition reaction with the polysiloxane.

5. The process according to claim 1, wherein unbranched allyl polyethers, methallyl polyethers, allyl polyesters and/or methallyl polyesters in a mixture with, before or after the branched allyl polyethers and/or methallyl polyesters are subjected to addition reaction with the polysiloxane.

6. The process according to claim 1, where the addition reaction of the allyl polyethers or methallyl polyethers with the Si—H-functional alkyl-polysiloxane is carried out in the presence of a solvent which allows homogeneous dissolution both of the allyl polyethers or methallyl polyethers and of the Si—H-functional alkyl-polysiloxane in the reaction mixture.

7. The process for preparing branched polysiloxanes comprising polyglycidol-polyether radicals, wherein the polyhydroxy-functional polysiloxanes obtained by the process of claim 1 are modified by alkoxylation, esterification, etherification and/or urethanization of at least some of the hydroxyl groups.

8. A Polysiloxane prepared according to claim 1.

9. A polysiloxane according to claim 8, wherein the at least one branched polyhydroxy-functional allyl polyether or methallyl polyether has a dendritic structure.

10. A polysiloxane according to claim 8, wherein the alkylpolysiloxane is a methylhydrogenpolysiloxane.

11. A polysiloxane according to claim 8, wherein it is composed of 10 to 100 siloxane units.

12. A polysiloxane according to claim 8, wherein C is 0, and at least one of the groups $R^2$ and $R^3$ is a radical R.

13. A polysiloxane according to claim 8, wherein only one of the groups $R^2$ and $R^3$ is a radical R.

14. A method of making coating compositions, polymeric moulding compounds or thermoplastic having anti-adhesive and/or dirt repellent action comprising adding 0.1% to 5% by weight of a polysiloxane prepared according to the process of claim 1 as an additive in coating compositions, polymeric moulding compounds or thermoplastics.

15. A coating composition, polymeric moulding compound or thermoplastic comprising a polysiloxane prepared according to the process of claim 1.

16. A coating composition or polymeric moulding compound containing 0.1%-10% by weight, of a polysiloxane prepared by the process of claim 1.

17. A thermoplastic composition containing 0.1%-5% by weight, of a polyhydroxy-functional polysiloxane prepared according to the process of claim 1.

* * * * *